United States Patent
Goto et al.

[11] Patent Number: 6,145,330
[45] Date of Patent: Nov. 14, 2000

[54] AUTOMOTIVE ELECTRIC COMPRESSOR DRIVING APPARATUS

[75] Inventors: Naomi Goto, Otsu; Makoto Yoshida, Kusatsu, both of Japan

[73] Assignee: Matsushita Electric Industrial Co., Ltd., Osaka, Japan

[21] Appl. No.: 08/947,527

[22] Filed: Aug. 22, 1997

[30] Foreign Application Priority Data

Aug. 30, 1996 [JP] Japan .................................. 8-230034

[51] Int. Cl.⁷ .................................................. B60H 1/22

[52] U.S. Cl. ........................... 62/180; 236/51; 236/91 C; 165/43

[58] Field of Search ..................... 165/202, 203, 165/204, 42, 43; 236/51, 91 R, 91 C, 91 D, 91 E; 62/180, 228.1, 228.4, 228.5, 229, 244

[56] References Cited

U.S. PATENT DOCUMENTS

| | | | |
|---|---|---|---|
| 4,320,797 | 3/1982 | Kagohata | 165/43 X |
| 5,440,890 | 8/1995 | Bahel et al. | 62/81 |
| 5,699,857 | 12/1997 | Flaishans et al. | 165/43 X |

*Primary Examiner*—Harry B. Tanner
*Attorney, Agent, or Firm*—Sheridan Ross P.C.

[57] ABSTRACT

An electric compressor, a four-way valve driving unit and an outside heat exchanger fan driving unit of an automotive electric compressor driving apparatus which are located in an engine room are connected to an electric compressor driving unit disposed outside a passenger compartment of an automobile and are controlled by an air conditioner controller disposed in a passenger compartment and connected to the electric compressor driving unit by one communication cable transmitting serial signals. In addition, the detection output of an outside temperature sensor is supplied to the air conditioner controller via the electric compressor driving unit and the communication cable.

14 Claims, 6 Drawing Sheets

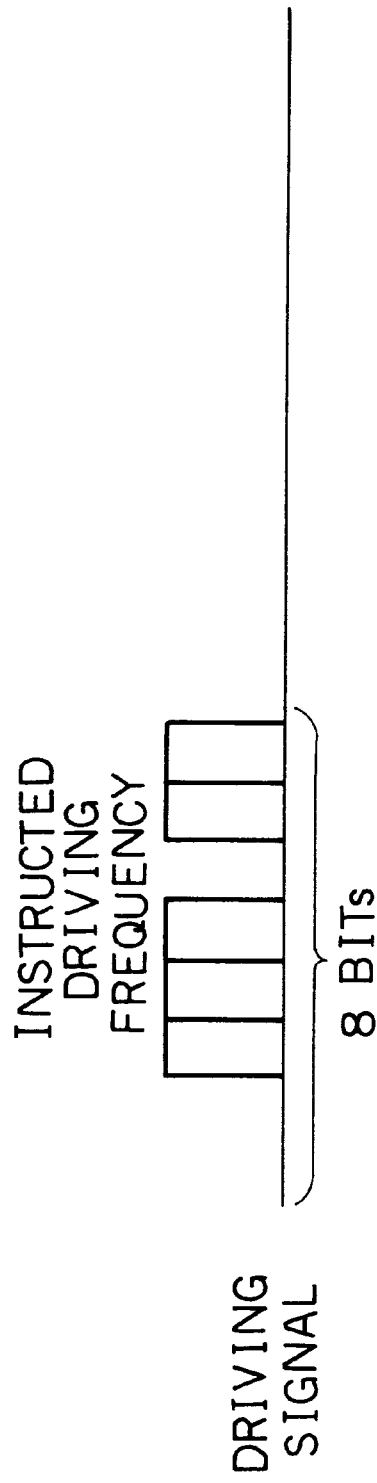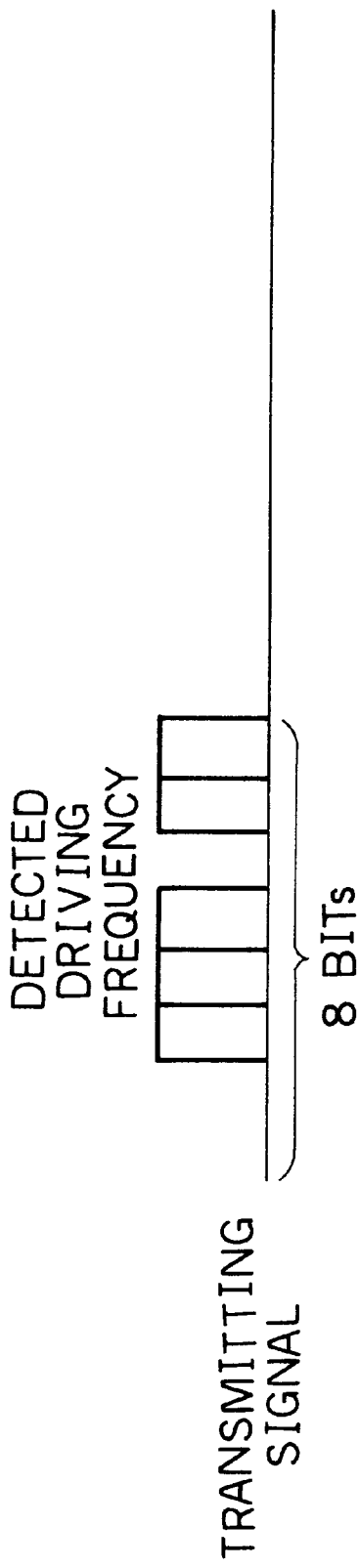

AUTOMOTIVE ELECTRIC COMPRESSOR DRIVING APPARATUS

BACKGROUND OF THE INVENTION

The present invention relates to an automotive electric compressor driving apparatus comprising driving circuits for air-conditioning components, data input circuits for sensors, and a serial communication circuit for inputting driving signals and outputting sensor data.

FIGS. 4 and 5 is a partially sectional view of an automobile having a conventional electric compressor driving apparatus for an automotive air conditioner. An air conditioner controller 25 is provided in the passenger compartment 30 of the automobile. A room temperature sensor 22 for detecting room temperature and a sunshine sensor 23 for detecting sunshine are provided in the passenger compartment 30. The detection outputs from the room temperature sensor 22 and the sunshine sensor 23 are supplied to the air conditioner controller 25. A room fan driving unit 15 for driving a room fan 6 for sending cool or warm air through a duct portion 40 of the air conditioner is also provided in the passenger compartment 30, and connected to the air conditioner controller 25.

An electric compressor 1, an electric compressor driving unit 29 for driving the electric compressor 1 and a four-way valve 7 for switching the passages of refrigerant compressed by the electric compressor 1 are provided in an engine compartment 31 outside the passenger compartment 30 of the automobile. The four-way valve 7 is driven by a valve driving unit 8 in the engine compartment 31. An outside heat exchanger fan 3 is also provided in the engine compartment 31. Near the outside heat exchanger fan 3, an outside heat exchanger fan driving unit (hereinafter referred to as an outside fan driving unit) 16 is provided to drive the outside heat exchanger fan 3. At the front end of the engine compartment 31, an outside temperature sensor 21 is provided to detect outside air temperature. The electric compressor driving unit 29, the valve driving unit 8, the fan driving unit 16 and the outside temperature sensor 21 are connected to the air conditioner controller 25 by respective connection cables 35 passing through a partition wall 32. FIG. 5 is a view showing the connection of the above-mentioned conventional electric compressor driving apparatus. In FIG. 5, the electric compressor driving unit 29, the valve driving unit 8, the outside fan driving unit 16 and the outside temperature sensor 21 provided in the engine compartment 31 are connected to the air conditioner controller 25 provided in the passenger compartment 30 by the respective connection cables 35.

In the conventional automotive electric compressor driving apparatus, the electric compressor 1 is driven by a motor current having an instructed driving frequency which is instructed by a driving signal from the air conditioner controller 25. The instructed driving frequency of the driving signal is sent by an eight-bit serial signal as shown in FIG. 6A. The electric compressor driving unit 29 detects a driving frequency corresponding to an actual rotating speed of the electric compressor 1, and sends an eight-bit transmitting signal indicating the detected driving frequency to the air conditioner controller 25 as shown in FIG. 6B. This method is used because of the following reason. For the purpose of protection of the electric compressor 1, when the electric compressor 1 is not driven at a rotating speed corresponding to the instructed driving frequency, and the difference between the instructed driving frequency and the detected driving frequency exceeds a predetermined value, an occurrence of malfunction in the electric compressor 1 is determined, and operation for protection of the electric compressor 1 is performed. The air conditioner controller 25 also delivers respective driving signals to the valve driving unit 8, the outside fan driving unit 16 and the room fan driving unit 15 for driving the room fan. These driving signals are obtained by arithmetic operations using an arithmetic operation unit (not shown) in the air conditioner controller 25.

The valve driving unit 8 is provided near the four-way valve 7, and the outside fan driving unit 16 is provided near the outside heat exchanger fan 3. In other words, since these units are provided near respective connection pipes, these units are disposed outside the passenger compartment 30. Furthermore, the outside temperature sensor 21 is usually provided outside the passenger compartment 30 in order to detect outside temperature. On the other hand, the air conditioner controller 25, to which the above-mentioned units are connected, is usually disposed in the passenger compartment 30 in consideration of environmental conditions.

Therefore, the total number and the whole lengths of the cables extended between the air conditioner controller 25 and the above-mentioned units from the inside to the outside of the passenger compartment 30 are large. Furthermore, the number of connectors 38 provided at the passing-through parts of the partition wall 32 of the passenger compartment 30 is large, whereby the reliability of the electric connection is low. In particular, since the output signal from the outside temperature sensor 21 has a small analog voltage value, the output signal is susceptible to electric noise if the cable is long.

Accordingly, an object of the present invention is to provide an automotive electric compressor driving apparatus capable of reducing the number of connectors 38 for the various units and sensors for air-conditioning, and capable of enhancing the reliability of electric connection.

BRIEF SUMMARY OF THE INVENTION

In order to solve the above-mentioned problems, in the automotive electric compressor driving apparatus in accordance with the present invention, an electric compressor driving unit for driving air-conditioning components, a data input device for an air-conditioning sensor, and a serial communication circuit for receiving driving signals for instructing the operation of the electric compressor driving unit and for outputting input data from the air-conditioning sensor are provided in the electric compressor driving unit disposed outside the passenger compartment. As a result, the number of communication cables connecting among the units disposed outside the passenger compartment and the units disposed inside the passenger compartment can be decreased, and the communication cables can be shortened. Since the number of communication cables is decreased, the number of connectors can also be decreased in comparison with the prior art. Since a high voltage is applied to the electric compressor driving unit, the electric compressor driving unit must be disposed outside the passenger compartment to ensure safety. Therefore, output devices for delivering signals to a four-way valve driving unit and an outside heat exchanger fan driving unit disposed outside the passenger compartment are built in the electric compressor driving unit disposed outside the passenger compartment. In addition, the output of the air-conditioning sensor is supplied to the electric compressor driving unit through an input device which performs signal processing, such as amplification. Noise resistance property is improved by the above-mentioned configuration. Since the four-way valve driving unit and the outside heat exchanger fan driving unit are connected to the electric compressor driving unit disposed outside the passenger compartment, the cables for connecting between the units are made shorter than cables used when such units are connected to an air conditioner controller disposed inside the passenger compartment. Furthermore, connectors are not required for the four-way valve driving unit and the outside heat exchanger fan driving unit, whereby the number of connectors is decreased.

In the electric compressor driving unit, the serial communication cable is used to receive driving signals from the air conditioner controller and to deliver data of the air-conditioning sensor to the air conditioner controller. Therefore, the number of cables connecting between the electric compressor driving unit and the air conditioner controller remains unchanged in comparison with the number of cables for the conventional example. Since digital signals are transmitted or received on the basis of time sharing control, three wires in total, namely one wire for transmission, one wire for reception and one wire as a common grounding wire, can be used for the communication cable. Even when the amount of data to be transmitted or received is increased or decreased, the number of wires remain unchanged, although time required for transmission or reception is just increased or decreased.

It is thus possible to obtain an automotive electric compressor driving apparatus capable of simplifying connections among various units and sensors for air-conditioning, and capable of enhancing the reliability of electric connection.

BRIEF DESCRIPTION OF SEVERAL VIEWS OF THE DRAWING

FIG. 6A is a view showing data received by the electric compressor driving unit in accordance with the conventional example; and FIG. 6B is a view showing data transmitted by the conventional electric compressor driving unit.

DETAILED DESCRIPTION OF THE INVENTION

Figure 1:
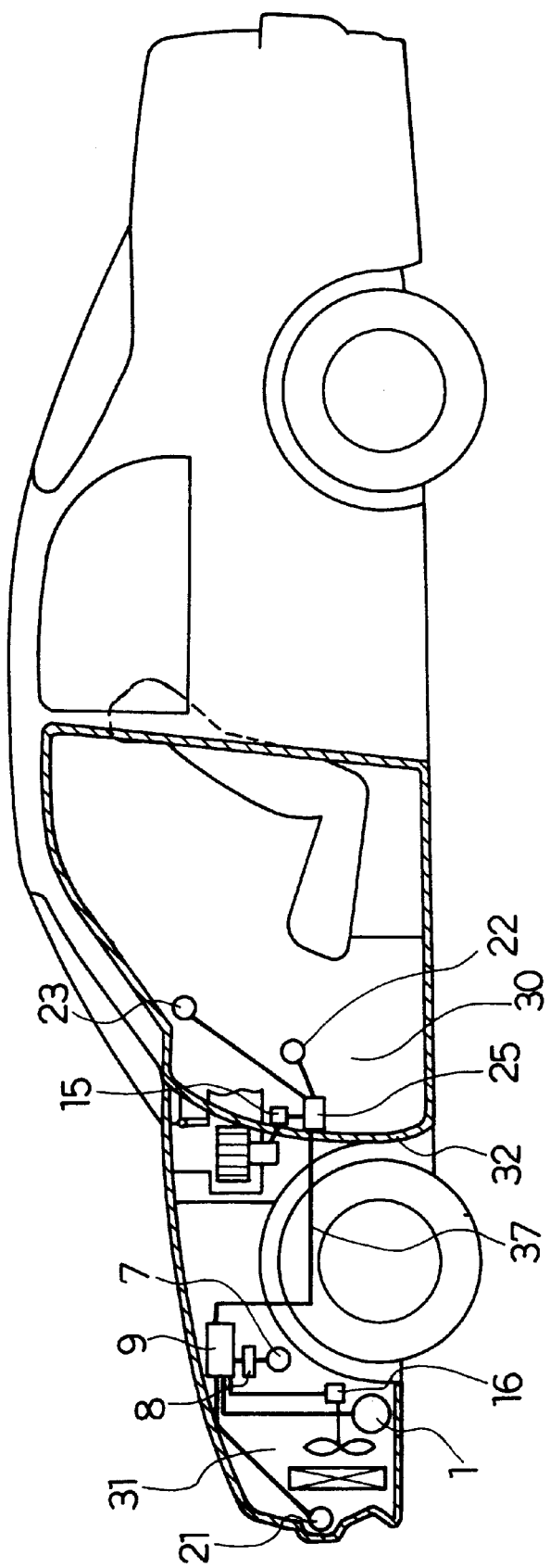
FIG. 1 is a partially sectional side view of an automobile showing a configuration of an automotive electric compressor driving apparatus in accordance with an embodiment of the present invention.
Figure 2:
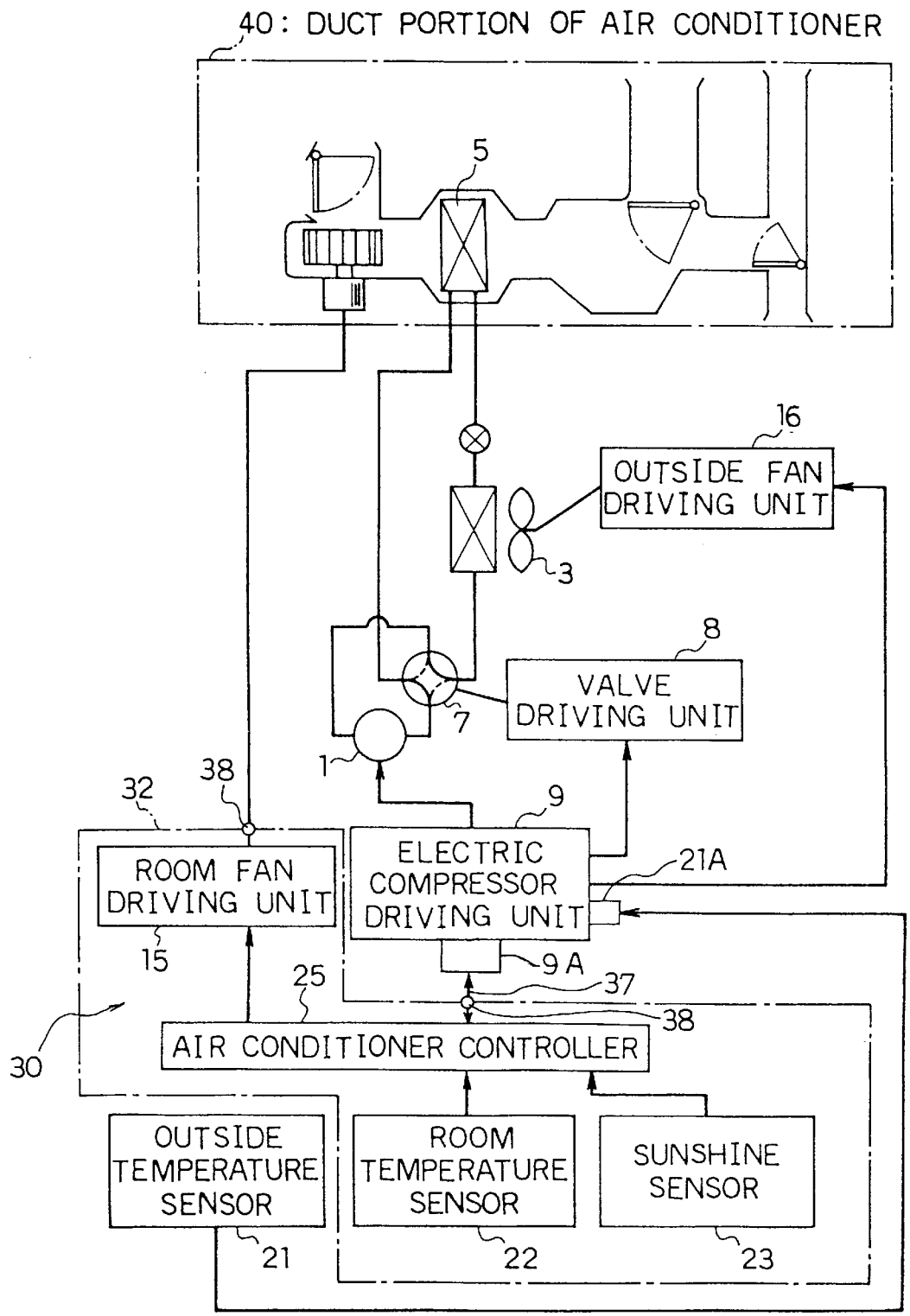
FIG. 2 is a block diagram showing the connections in the electric compressor driving apparatus in accordance with the embodiment of the present invention.

An embodiment of the electric compressor driving apparatus of the present invention is described below referring to FIG. 1 to FIG. 3B. FIG. 1 is a partially sectional side view of an automobile. Various units of the electric compressor driving apparatus are provided in a front passenger compartment 30 and an engine compartment 31 outside the passenger compartment 30 of the automobile as described below in detail. The passenger compartment 30 is partitioned from the engine compartment 31 by a partition wall 32. FIG. 2 is a block diagram showing the connections in the electric compressor driving apparatus.

Referring to FIG. 1 and FIG. 2, an electric compressor driving unit 9 is disposed in the engine compartment 31, and connected to a valve driving unit 8 for driving a four-way valve 7, an outside fan driving unit 16 for driving an outside heat exchanger fan 3 and an outside temperature sensor 21 provided in the engine compartment 31. The electric compressor driving unit 9 comprises output devices for delivering signals to the valve driving unit 8 and the outside fan driving unit 16. Furthermore, an electric compressor 1 is connected to the electric compressor driving unit 9. The electric compressor driving unit 9 has a serial communication circuit 9A for inputting driving signals of the electric compressor 1, the valve driving unit 8 and the outside far driving unit 16 from the air conditioner controller 25, and outputting data based on an output signal detected by the outside temperature sensor 21 to the air conditioner controller 25.

The air conditioner controller 25 is disposed in the passenger compartment 30. Additionally, a room temperature sensor 22, a sunshine sensor 23 and a room fan driving unit 15 for room draft provided in the passenger compartment 30 are connected to the air conditioner controller 25.

The serial communication circuit 9A of the electric compressor driving unit 9 is connected to the air conditioner controller 25 via a communication cable 37 passing through the partition wall 32 of the passenger compartment. The communication cable 37 is connected through a connector 38 disposed on the partition wall 32.

Figure 3A:
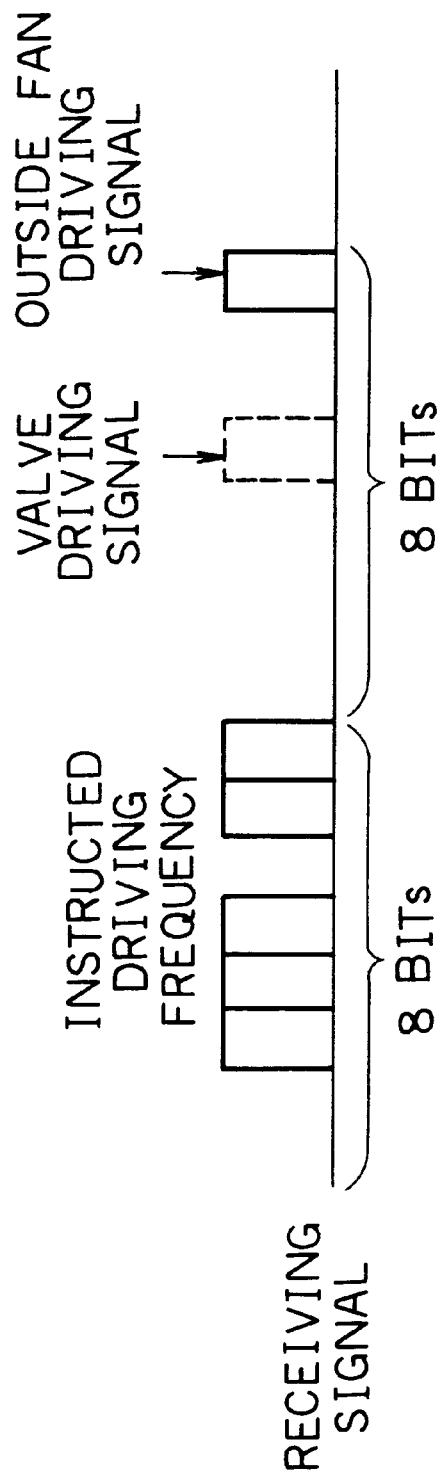
FIG. 3A is a view showing data received by an electric compressor driving unit in accordance with the embodiment of the present invention.
Figure 3B:
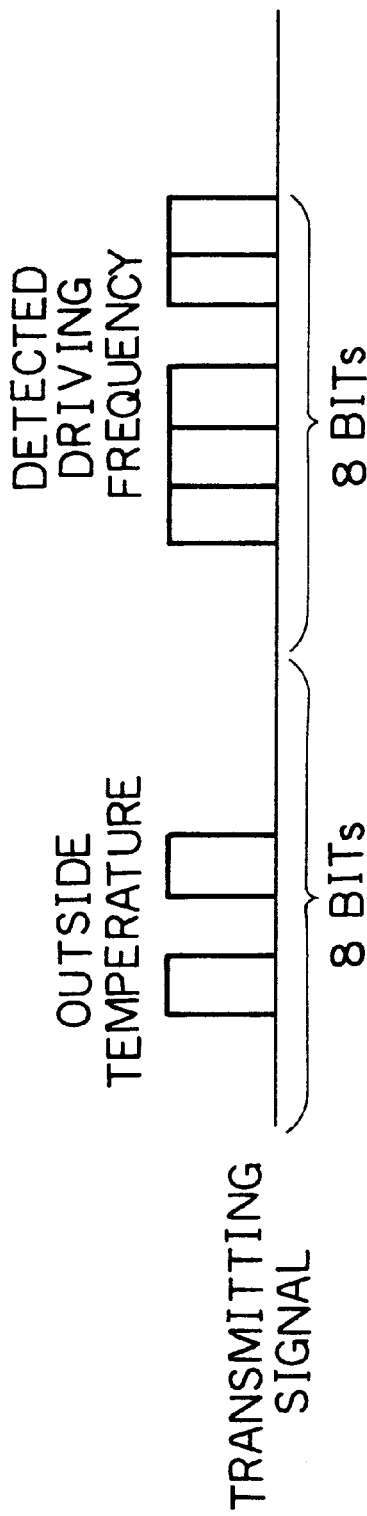
FIG. 3B is a view showing data transmitted by the electric compressor driving unit in accordance with the embodiment of the present invention.
Figure 4:
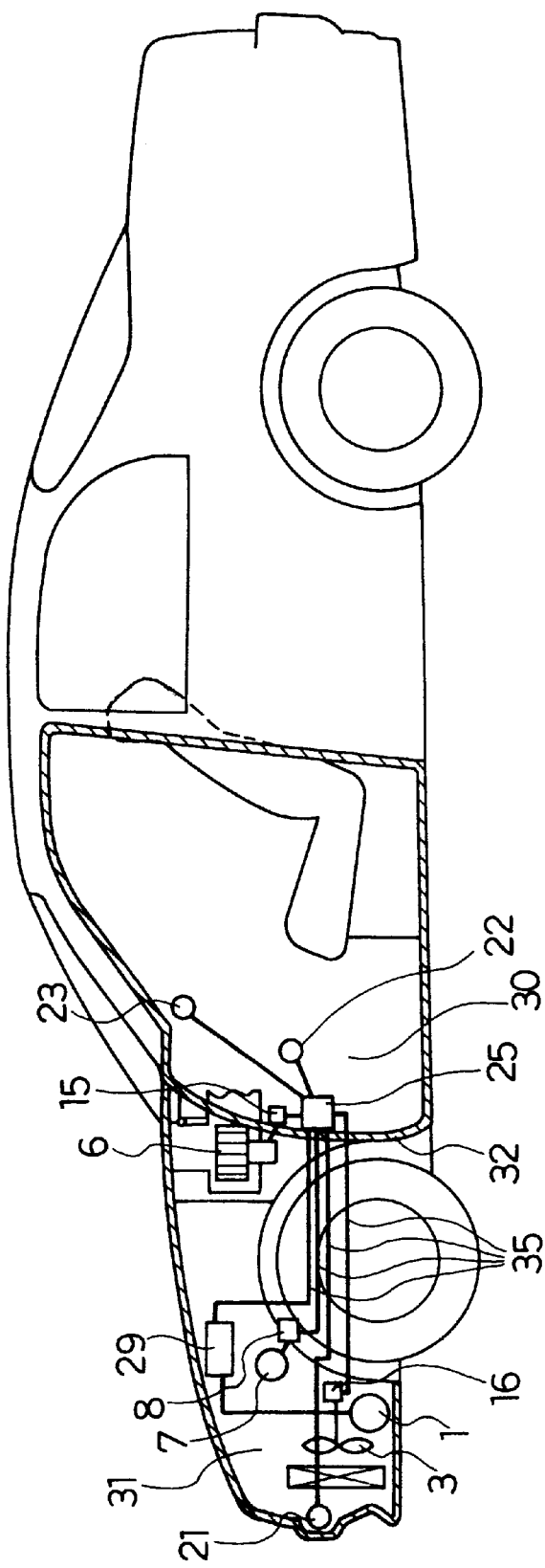
FIG. 4 is the partially sectional side view of the automobile showing the arrangement of the electric compressor driving apparatus in accordance with a conventional example.
Figure 5:
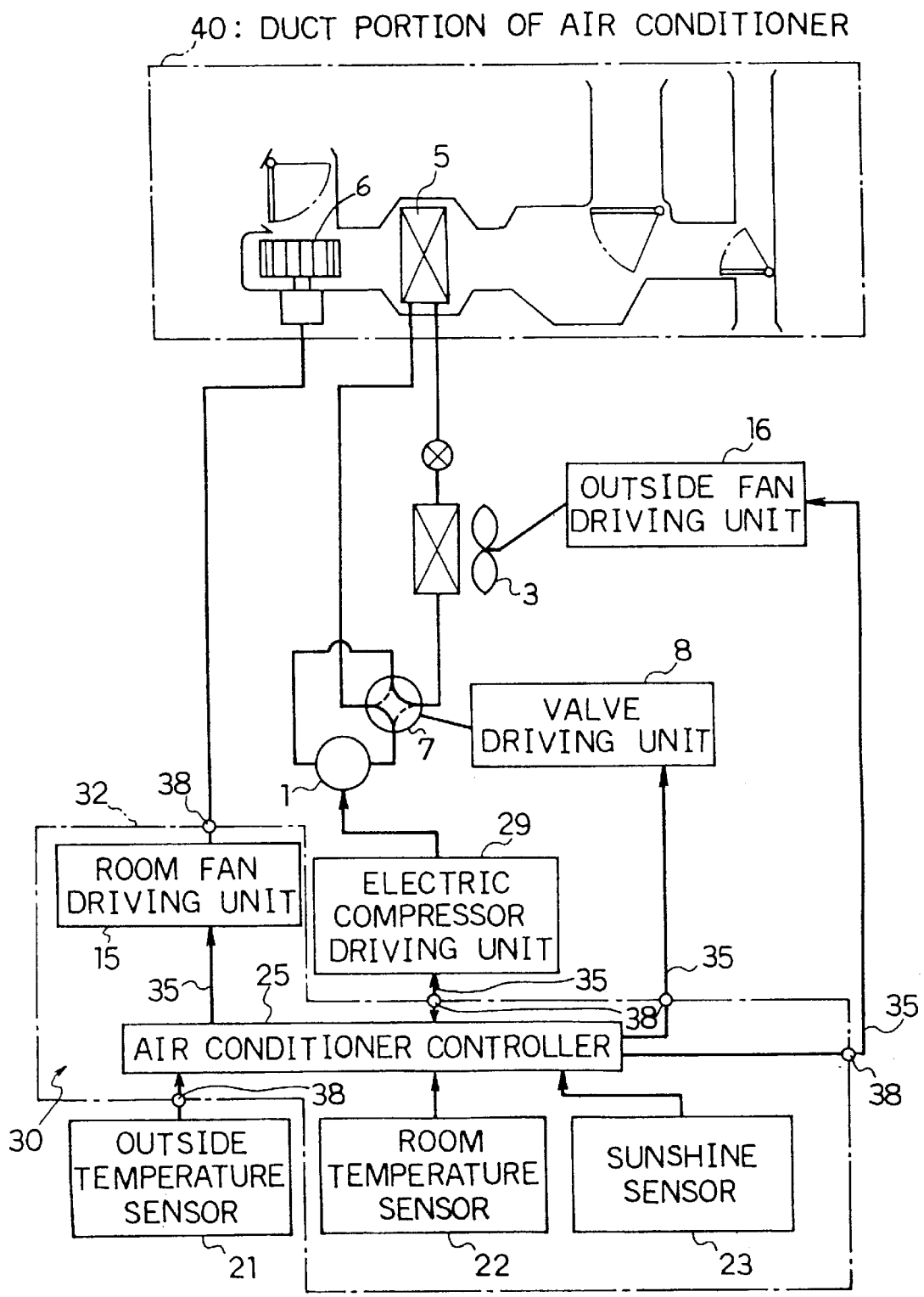
FIG. 5 is the block diagram showing the connections in the electric compressor driving apparatus in accordance with the conventional example.

Communication between the electric compressor driving unit 9 and the air conditioner controller 25 is carried out as described below. As shown in FIG. 3A, from the air conditioner controller 25, the electric compressor driving unit 9 receives an 8-bit serial signal indicating an instructed driving frequency of driving current for driving the electric compressor 1, and the following 8-bit serial signal indicating a valve driving signal for driving the valve driving unit 8 and an outside fan driving signal for driving the outside fan driving unit 16.

In the case of the serial signals shown in FIG. 3A, for example, the instructed driving frequency is set at 60 Hz, the valve driving signal for the valve driving unit 8 is turned OFF, and the outside fan driving signal for the outside fan driving unit 16 is turned ON.

The detection output of the outside temperature sensor 21 is inputted to the electric compressor driving unit 9 through an input device 21A for amplifying the detection output. The inputted detection output of the outside temperature sensor 21 is converted into an 8-bit serial signal in the serial communication circuit 9A of the electric compressor driving unit 9 and transmitted to the air conditioner controller 25 as outside temperature data via the communication cable 37. The outside temperature is 20° C., for example, according to the outside temperature data shown in FIG. 3B. A driving frequency corresponding to an actual rotating speed of the electric compressor 1 is detected by the electric compressor driving unit 9. Data of a detected driving frequency is transmitted to the air conditioner controller 25 by an 8-bit serial signal shown in FIG. 3B via the communication cable 37.

The air conditioner controller 25 performs predetermined arithmetic operations on the basis of the outside temperature data sent from the electric compressor driving unit 9, and detection data sent from the room temperature sensor 22 and the sunshine sensor 23. The air conditioner controller 25 thus determines the operations of the valve driving unit 8, the outside fan driving unit 16, the room fan driving unit 15, the electric compressor 1, and the like.

In the example of the serial signals shown in FIG. 3A, since the driving signal for the outside fan driving unit 16 has been turned ON, the electric compressor driving unit 9 drives the outside fan driving unit 16, and activates the outside heat exchanger fan 3. Since the driving signal for the valve driving unit 8 has been turned OFF, the valve driving unit 8 is not driven, and the four-way valve 7 is turned OFF. As a result, heated refrigerant is sent to a room heat exchanger 5 disposed in a duct portion 40 of the air conditioner, whereby heating operation is performed. The electric compressor 1 is operated at 60 Hz, for example.

Although the air-conditioning function of the electric compressor driving apparatus of the present embodiment is substantially identical to that of the conventional example, data transmission and reception between the outside electric compressor driving unit 9 and the air conditioner controller 25 disposed in the passenger compartment 30 is carried out by using a single communication cable 37. Therefore, a single connector 38 is used for connecting the communication cable 37 passing through the partition wall 32 from the passenger compartment 30 to the engine compartment 31. Consequently, connection can be simplified, and reliability of connection can be improved.

Although the present invention has been described in terms of the presently preferred embodiments it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An automotive electric compressor driving apparatus comprising:

a driving circuit for driving air-conditioning components provided outside a passenger compartment of an automobile, an input circuit for inputting data from an air-conditioning sensor to said driving circuit, said input circuit being provided outside the passenger compartment, and a serial communication circuit for supplying driving signals to said driving circuit and for delivering data sent from said air-conditioning sensor; and a passenger compartment fan driving unit wherein control information from the driving circuit is communicated to the passenger compartment fan driving unit in a way which avoids the serial communication circuit.

2. An automotive electric compressor driving apparatus comprising:

a driving circuit for driving air-conditioning components provided outside a passenger compartment of an automobile, an input circuit for inputting data from an air-conditioning sensor to said driving circuit, said input circuit being provided outside the passenger compartment, and a serial communication circuit for supplying driving signals to said driving circuit and for delivering data sent from said air-conditioning sensor; and a sunshine sensor wherein the control information from the sunshine sensor is communicated to the driving circuit in a way which avoids the serial communication circuit.

3. An automotive electric compressor driving apparatus comprising:

a driving circuit for driving air-conditioning components provided outside a passenger compartment of an automobile, an input circuit for inputting data from an air-conditioning sensor to said driving circuit, said input circuit being provided outside the passenger compartment, and a serial communication circuit for supplying driving signals to said driving circuit and for delivering data sent from said air-conditioning sensor;

a first data stream consisting essentially of data from the driving circuit to the input circuit; and a second data stream consisting essentially of data from the input circuit to the driving circuit wherein data carried by the serial communication circuit consists of the first data stream and the second data stream.

4. An automotive electric compressor driving apparatus comprising:

an air conditioner controller provided in a passenger compartment of an automobile, an electric compressor driving unit provided outside the passenger compartment and used for driving air-conditioning components dispersed outside the passenger compartment, a sensor provided outside the passenger compartment and used for supplying detection output to said electric compressor driving unit, a serial communication circuit disposed outside the passenger compartment and connected to said electric compressor driving unit, for inputting driving signals of said air-conditioning components, from said air conditioner controller to said electric compressor driving unit and outputting data based on an output signal of said sensor from said compressor driving unit to said air conditioner controller, a communication cable provided through a partition wall of the passenger compartment and used for connecting said air conditioner controller to said serial communication circuit and for transmitting serial signals; and a passenger compartment fan driving unit wherein control information from the air conditioner controller is communicated to the passenger compartment fan driving unit in a way which avoids the serial communication circuit.

5. An automotive electric compressor driving apparatus comprising:

an air conditioner controller provided in a passenger compartment of an automobile, an electric compressor driving unit provided outside the passenger compartment and used for driving air-conditioning components dispersed outside the passenger compartment, a sensor provided outside the passenger compartment and used for supplying detection output to said electric compressor driving unit, a serial communication circuit disposed outside the passenger compartment and connected to said electric compressor driving unit, for inputting driving signals of said air-conditioning components, from said air conditioner controller to said electric compressor driving unit and outputting data based on an output signal of said sensor from said compressor driving unit to said air conditioner controller, and a communication cable provided through a partition wall of the passenger compartment and used for connecting said air conditioner controller to said serial communication circuit and for transmitting serial signals; and a sunshine sensor wherein the control information from the sunshine sensor is communicated to the air conditioner controller in a way which avoids the serial communication circuit.

6. An automotive electric compressor driving apparatus comprising:

an air conditioner controller provided in a passenger compartment of an automobile, an electric compressor driving unit provided outside the passenger compartment and used for driving air-conditioning components dispersed outside the passenger compartment, a sensor provided outside the passenger compartment and used for supplying detection output to said electric compressor driving unit, a serial communication circuit disposed outside the passenger compartment and connected to said electric compressor driving unit, for inputting driving signals of said air-conditioning components, from said air conditioner controller to said electric compressor driving unit and outputting data based on an output signal of said sensor from said compressor driving unit to said air conditioner controller, and a communication cable provided through a partition wall of the passenger compartment and used for connecting said air conditioner controller to said serial communication circuit and for transmitting serial signals;

a first data stream consisting essentially of data from the air conditioner controller to the electric compressor driving unit; and a second data stream consisting essentially of data from the electric compressor driving unit to the conditioner controller wherein data carried by the serial communication circuit consists of the first data stream and the second data stream.

7. A method for driving an automobile air conditioner system comprising the steps of:

serially communicating driving signals from an air-conditioning driving circuit to a electric compressor driving unit; and serially communicating sensor data from a sensor to the air-conditioning driving circuit, wherein the electric compressor driving unit is located outside a passenger compartment of the automobile.

8. The method for driving the automobile a conditioner system of claim 7, wherein the sensor provides at least one of: an outside the automobile temperature, an inside the passenger compartment temperature and an determination of the presence of sunlight.

9. The method for driving the automobile air conditioner system of claim 7, further comprising the steps of providing a passenger compartment fan driving unit; and communicating control information from the air-conditioning driving circuit to the passenger compartment fan driving unit, wherein this communicating step avoids a serial communication circuit.

10. The method for driving the automobile air conditioner system of claim 7, further comprising the steps of providing a sunshine sensor; and communicating control information from the sunshine sensor to the air-conditioning driving circuit, wherein this communicating step avoids a serial communication circuit.

11. The method for driving the automobile air conditioner system of claim 7, wherein a fan coupled to the passenger compartment is located outside the passenger compartment.

12. The method for driving the automobile air conditioner system of claim 7, wherein data carried on a serial communication circuit consists of driving signals and sensor data.

13. The method for driving the automobile air conditioner system of claim 7, wherein the sensor is a temperature sensor.

14. A method for driving an automobile air conditioner system comprising the steps of:

serially communicating driving signals from an air-conditioning controller to a driving unit by way of a serial communication circuit, wherein the driving unit is located outside a passenger compartment of the automobile; and serially communicating sensor data from the driving unit to the air conditioning controller by way of the serial communication circuit, wherein the air conditioning controller is located inside the passenger compartment;

communicating with at least a valve driving unit, an outside fan driving unit, a compressor, and a first sensor wherein this communicating step is performed by the driving unit and avoids the serial communication circuit; and communicating with at least a second sensor and a passenger compartment fan driver wherein this communicating step is performed by the air conditioning controller and avoids the serial communication circuit.

* * * * *